US 6,634,342 B1

(12) United States Patent
Wouters et al.

(10) Patent No.: US 6,634,342 B1
(45) Date of Patent: Oct. 21, 2003

(54) FUEL SYSTEM FOR A VEHICLE

(75) Inventors: Paul Wouters, Vilvoorde (BE);
Stéphane Leonard, Brussels (BE);
Jules-Joseph Van Schaftingen, Wavre (BE); Joël Op De Beeck, Duffel (BE);
François Dougnier, Boortmeerbeek (BE); Yannick Gerard, Kraainem (BE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 09/980,838

(22) PCT Filed: Jun. 6, 2000

(86) PCT No.: PCT/EP00/05932
§ 371 (c)(1),
(2), (4) Date: Jul. 8, 2002

(87) PCT Pub. No.: WO00/74965
PCT Pub. Date: Dec. 14, 2000

(30) Foreign Application Priority Data

Jun. 7, 1999 (BE) .............................................. 9900399

(51) Int. Cl.$^7$ ............................................. F02M 33/02
(52) U.S. Cl. ........................ 123/516; 123/518; 123/519; 137/587
(58) Field of Search ................................ 123/516, 518, 123/519; 220/4.14, 905, 723; 137/587

(56) References Cited

U.S. PATENT DOCUMENTS 3,426,937 A * 2/1969 Boschi et al.
4,714,171 A * 12/1987 Sasaki et al. ........... 220/85 VR
4,753,368 A * 6/1988 Lescaut ....................... 220/454
5,398,839 A * 3/1995 Kleyn ......................... 220/421
5,547,096 A * 8/1996 Kleyn ......................... 220/4.14
5,596,971 A * 1/1997 Kidokoro ..................... 123/516
5,722,374 A * 3/1998 Kidokora et al. ........... 123/516
6,260,544 B1 * 7/2001 Spry et al. .................. 123/516
6,409,040 B1 * 6/2002 Distelhoff et al. ........... 220/562
6,453,885 B1 * 9/2002 Short ........................ 123/518
6,491,180 B2 * 12/2002 Distellhoff et al. ......... 220/562
6,543,426 B1 * 4/2003 Schwochert ................ 123/516

FOREIGN PATENT DOCUMENTS

DE 41 42 016 A 6/1993
FR 2 697 892 5/1994

* cited by examiner

Primary Examiner—Thomas N. Moulis
(74) Attorney, Agent, or Firm—Larson & Taylor, PLC

(57) ABSTRACT

Fuel system for a vehicle with a heat enigine, comprising a hollow body made of plastic, designed to contain or to transport fuel, and means of covering this hollow body by means of a rigid jacket surrounding the hollow body. The covering means form, with the surface of the hollow body, a confined space fitted with a device for flushing by means of air. The air which entrains any emitted vapours is purified before being discharged into the atmosphere or is mixed with the air blown out by the engine.

Figure 1:
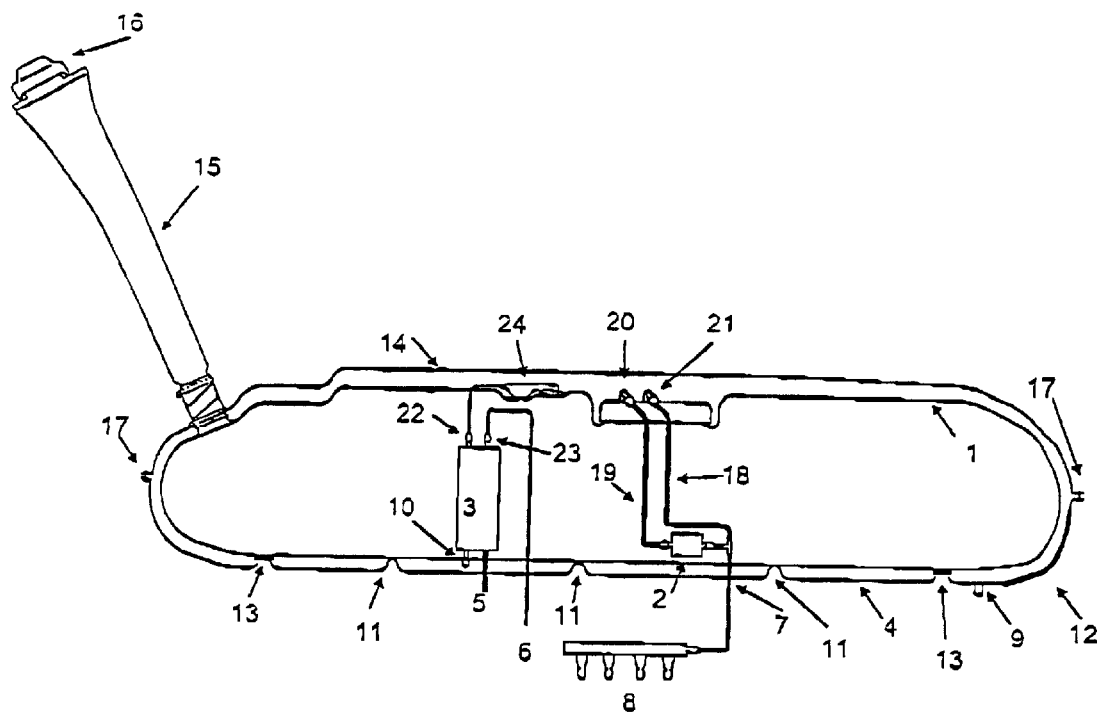

The invention is applicable to a double jacket for a fuel tank made of plastic or to a fuel pipe fitted with a concentric channel.

14 Claims, 3 Drawing Sheets

FUEL SYSTEM FOR A VEHICLE

The present invention relates to a fuel system for a vehicle.

In vehicles with a heat engine, in particular in motor vehicles, the tanks currently used for retaining liquid or gaseous fuel often consist mainly of plastic, because of the advantages of weight, mechanical strength, chemical stability and ease of use, in particular when they have complex external shapes, A large number of accessories for these tanks forming part, like the latter, of the components providing the fuel function of vehicles are also, increasingly, made entirely or partly of plastic. These accessories include, among other things, the fuel feed pipes, the vent valves, the canisters with activated carbon for absorbing vapours, the fuel filters and pumps and the filler nozzles.

The recent increase in the strictness of standards in respect of the environment, in particular those relating to hydrocarbon emissions by vehicles with a heat engine, has made it necessary to further improve the impermeability of on-board tanks, and also of Their accessories and connections. This is because it is not unusual for the overall evaporative losses of all of the latter to be of the same order of magnitude as, or even in some cases to exceed, those which are strictly due to the tank itself. The prospect of drastic strengthening, scheduled for the short term, of the restrictive nature of these environmental standards leads to the imperative need to develop orginal overall solutions, the impermeability and sewn, performances of which far exceed the values currently required at present Various techniques are known to make the surfaces of objects made of plastic impermeable. Two different approaches have led to proposing solutions which have been implemented in the methods for manufacturing these objects. The first is based on the surface treatment of the object by means of a plasma or of a chemical reagent such as sulphuric anhydride or fluorine gas capable of altering the molecules of the plastic located at the surface of the object Another approach consists in inserting, within the thickness of the plastic forming the object, a layer consisting of a particular material, often a thermoplastic, with a barrier property with respect to one or several gases or liquids. In the latter case, broad use has been made of implementary techniques using co-extrusion.

Patent Application JP-A-08/118971 describes a fuel tank, the lower part of which has a two-layer structure separated by an empty space. Two orifices drilled in the outer layer allow ambient air to enter over the face of the tank located at the front end of the vehicle. When the vehicle is moving, the air enters the orifices, flows between the two layers and exits by means of two other orifices drilled in its outer layer, in Me direction of the rear of the vehicle. The flow of air between the two layers when the vehicle is moving cools the tank and its contents and keeps it at a moderate temperature, which has the effect of reducing the generation of hydrocarbon vapours by the tank However, the hydrocarbon losses by evaporation are not eliminated by this fuel tank configuration, This is because the air discharged to the atmosphere which leaves the double layer is loaded with an amount of vapour which corresponds to the evaporative losses of the tank.

Moreover, no cooling occurs when the vehicle is stationary and the generation of vapours is then at a maximum.

French Patent Application FR-2697892-A1 discloses a triple pipe with four concentric walls in which the inner pipe and the intermediate pipe transport fuel from a tank towards an engine and back. In the outermost pipe, gases are withdrawn from the tank and are injected into the pipe which transports them to a treatment device.

In this document, no mention is made of any flushing of vapours which would pass through the inner walls.

German Patent Application DE-4142016-A1, which constitutes the closest prior art, relates to a system in which a fuel tank is surrounded by a second skin, thereby defining a space which is filled with material absorbing the fuel vapours. However, in this system, no mention is made of a partial jacket around the tank made by a wall of the vehicle.

To this end, the invention relates to a fuel system for a vehicle with a heat engine, comprising a hollow body made of metal or of plastic, designed to contain or to transport fuel, and means of covering this hollow body, in which at least part of the outer surface of the hollow body is surrounded by a rigid jacket, the hollow body and the rigid jacket defining, at least in part, at least one confined space around the hollow body, and according to which the confined space is fitted with a device for flushing by means of a gas intended to be subjected subsequently to a physical or chemical treatment, this confined space being defined, at least in part, by the jacket and by a wall of the vehicle.

The term "fuel" denotes any chemical composition which can be burnt in the presence of an oxidant, generally the oxygen in air, which can be used in a heat engine equipping a vehicle. The fuels may be at ambient temperature in any of the three, solid, liquid or gaseous, states. In vehicles, fuels which are liquid or gaseous at room temperature and under atmospheric pressure or greater are generally preferred. Liquid fuels such as petrol and diesel are most particularly preferred.

The fuel system according to the invention is intended for any vehicle with a heat engine, in particular for motor vehicles such as tracks, cars and motor cycles. The term "heat engine" is intended to designate any engine converting the chemical energy contained in a fuel into mechanical energy. It may consist of any type of internal combustion engine, piston-type engines or rotary engines, using liquid fuels (such as, for example, petrol, fuel oil, alcohol, etc.) or gaseous fuels (such as, for example, petroleum gas, natural gas, lean gas, hydrogen, methane, etc.).

By extension, the term "heat engine" is also intended to designate one or more electrical engines supplied by at least one fuel cell in the case where this fuel comprises at least a hydrocarbon and/or an alcohol, The fuel system designates any device incorporated in the vehicle, the function of which is to store, purify, measure or transport a fuel intended to supply the heat engine. The fuel system comprises at least one tank and a pipe supplying the motor with fuel. It may also comprise, in a non-limiting manner, one or more of the following accessories: pipe and valve for venting the tank, filler nozzle, canister comprising a material which retains the hydrocarbon vapours, fuel filter, fuel pump, tank gauge, electrical connector, closure cap and any member, in general, through which the fuel passes in the liquid or gaseous state.

The term "hollow body" denotes any object whose surface has at least an empty or concave part The hollow body of the fuel system according to the invention is made of metal or of plastic. In the latter case, it comprises at least one synthetic polymer which is in the solid state under ambient conditions. Hollow bodies made of plastic are preferred, because of Their better elasticity and their greater ability to be formed into complex shapes. The term "plastic" denotes both the generally homogeneous material of a monolayer structure and the heterogeneous material of a multilayer structure. In particular, the hollow body advantageously comprises at least one thermoplastic polymer, that is to say, a polymer which, under the influence of heat, melts or softens enough to enable it to be shaped.

The term "means of covering" the hollow body denotes any device or system associated with the hollow body and providing, or at least improving, the insulation of the hollow body from the atmosphere external to the vehicle and/or stresses of a physical or chemical nature which arise from this external atmosphere. By way of example, mention may be made, among others, of thermal insulation devices, acoustic insulation devices, shields, cladding and jackets of various types and shells for mechanical protection According to the invention, at least part of the outer surface of the hollow body is covered with a rigid jacket. The term "rigid jacket" denotes any covering device, made of metal or of plastic, capable of eliminating or of strongly limiting deformations of the object which it covers or contains, which would be caused by mechanical or thermal stress arising from the external environment. By extension, the rigid jacket also denotes any covering device where only any one or more parts are rigid and make it possible to eliminate or limit the deformations.

By extension, term "rigid" also denotes covering devices which themselves can be deformed, to the extent where they can nevertheless eliminate or limit the deformation of the object which they cover.

Rigid jackets made of plastic are preferred. The term "plastic" here has the same meaning as that explained above, in particular a possible structure made of one or more layers.

According to the invention, the rigid jacket may cover the entire outer surface of the hollow body. In contrast, it may also cover only one or more parts, which may or may not be adjoining, of this outer surface.

The term "outer surface" of the hollow body designates the surface of his hollow body located on the convex side, at the boundary of the hollow body with its external environment According to the invention, the hollow body and the rigid jacket define a confined space around the hollow body, that is to say a space between the hollow body and the jacket, which does not normally communicate with the external environment, except by means of one or more orifices designed for this purpose, The confined space thus defined may be a single space or, on the contrary, it may be in the form of a multiplicity of independent spaces.

According to the invention, the flushing gas is subjected to a physical or chemical treatment the aim of which is to remove hydrocarbon vapours which could be mixed therein The term "physical or chemical treatment" denotes any treatment purifying the flushing gas or burning it which removes The hydrocarbon vapours. Examples of a treatment of this sort are, among others, absorption and/or adsorption over a material capable of selectively retaining the hydrocarbons present in the gas, the removal of these vapours by condensation and separation of the liquid phase generated or the consumption of hydrocarbons by chemical combustion in the presence of oxygen in the heat engine of the vehicle. As a variant, it is also possible to precede the physical or chemical treatment with a preliminary treatment, for example by a thermal conditioning pretreatment It is possible to combine several different physical or chemical treatments.

The confined space in keeping with the fuel system according to the invention enables flushing by a gas, that is to say purging of the volume of gas which it contains by means of a gaseous composition introduced by means of an orifice drilled in at least one predetermined point of the jacket, the at least partial mixing of the gaseous composition introduced with that of the volume of the confined space, and the release of the mixture through at least one other orifice drilled in a different location of the jacket.

Preferably, the flushing gas is air. It is advantageous for the flushing air used to be atmospheric air, in particular air which can be taken from the environment surrounding the vehicle.

As a variant, advantageously, it is also possible to use the gas which has purged a canister as a flushing gas.

The term "canister" denotes a container containing a composition, which is usually solid and granulated, capable of retaining the hydrocarbon vapours of a gaseous stream. Out of all possible compositions, granulated activated carbon is very suitable. The canister may be a device independent of the other components of the fuel system. It may also be associated or integrated with another system element, for example with a fuel pipe, or with the tank itself.

In order to purge the volume of gas in the confined space, this space is associated with or is fitted with a flushing device which forces the flushing gas into or out of the confined space and which makes it possible, on mixing this gas with the gaseous composition in the volume of the confined space, for it to escape therefrom.

The flushing device may operate continuously or, in contrast, operate intermittently. It is beneficial, for example, to control the intermittent operation of the flushing device according to the detection of a given concentration of a particular chemical substance or category of chemical substance in the confined space. In particular, the flushing function may be controlled by the presence of a minimum hydrocarbon content in a confined space. It is also possible to control the intermittent operation as a function of detecting the crossing of a predetermined threshold of at least one physical condition of pressure or of temperature within the confined space.

In the case of intermittent operation, the electric motor is well suited for driving the flushing device. This is solution is particularly advantageous when the motor operates while the vehicle is immobile, with the heat engine switched off.

Any type of device suitable to the shape and to the volume of the confined space and to the type of gases which fill it may be suitable. It may involve, for example, an active device using a fan actuated by a motor for blowing or extraction or, in contrast, a passive device not using any mechanical energy supplied by a motor.

In the case of a passive flushing device, it is possible to use the low pressure created in the air inlet device of the heat engine of the vehicle to suck up the mixture of the flushing gas and the gaseous composition of the confined space. In order to do this, the escape orifice drilled in the wall of the jacket is connected to the air inlet device. This connection nay be established directly via a pipe. As a variant, it may also pass through a device for purifying the mixture before rejoining the air inlet device.

Another example of a passive flushing device is one where the natural kinetic energy of the ambient air resulting from the movement of the vehicle is used to force this air into the confined space.

In the case of an active flushing device, a particular case is one of flushing by means of a fan actuated by an electric motor. This fan may push the flushing gas into the confined space. As a variant, it may also draw the flushing gas mixed with the gaseous composition present in the confined space out of this confined space. Another variant is a flushing device comprising both a fan which pushes the flushing gas into the confined space and another fan which draws this gas mixed with the gaseous composition of the confined space out of this space.

Another particular case of the active flushing device is that of a fan mechanically driven by the heat engine of the vehicle. In particular, in this case, the fan may, for example, be driven by the distribution belt of the heat engine.

A first possibility for treating the flushing gas is provided by the system which comprises a pipe connected to a canister containing a material retaining the fuel vapours and an orifice drilled in the jacket by means of which air, used as a flushing gas, can be introduced and emerge into the pipe.

In this case, the canister denotes a container similar to the one described above. This may involve the same canister as above. As a variant, the canister for treating the flushing gas in question here may also consist of an additional canister, independent of the one described above in connection with the origin of the flushing gas.

The purging air of the canister must be air with a low fuel vapour content Ideally, it is fresh air taken from the environment of the vehicle. However, it is possible to tolerate the mixture of this purging air with the gas coming from the flushing of the confined space in keeping with the fuel system according to the invention.

Another possibility for treating the flushing air is the system which comprises a pipe connected to an air inlet device connected to the engine of the vehicle and an orifice drilled in the jacket by means of which air, used as a flushing gas, can be introduced and emerge into the pipe.

It is possible, for example, to make the flushing gas emerge in the air filter of the air inlet device. Another variant is to make it emerge in the air intake manifold of the engine.

A valve can control the amount of flushing gas injected into the air inlet device. This valve may be a electric valve controlled by the computer which manages the combustion of the engine.

A particular fuel system according to the invention is one in which the confined space is defined, at least in part, by the jacket and by a wall of the vehicle.

In this particular system, a wall of the vehicle engages with the jacket in order to cover at least part of the outer surface of tie tank and to define the confined space.

Any wall of the vehicle, whether it is an external or internal one thereof, is suitable. The outer walls of the vehicle are preferred. Among these outer walls, the walls located in The substructure of the vehicle, forming the boundary with the external atmosphere and, in particular, those which constitute the floor or the bottom thereof, are most particularly preferred.

According to this particular system, the wall of the vehicle is secured to the jacket by any generally known technique which produces a gastight assembly at the location of the join of the wall and the jacket. The term "gastight" means separate from the ambient atmosphere and preventing the natural and spontaneous mixture of the gases contained in the confined space with those of the atmosphere.

In the fuel systems comprising a sank, which have been described above, it is advantageous that at least part of the rigid jacket is in the form of a shell, The term "shell" denotes a partial envelope which is not closed and which is in the form of a hollow body.

A preferred shell is one which supports the tank.

It is also particularly beneficial for the shell to have baffles which support the tank. The shell is, for example, in the form of a concave surface in which grooves are hollowed out in the form of baffles.

Advantageously, the hollows of the baffles form channels which guide the flow of the flushing gas over the outer surface of the tank. This type of shell also provides an additional rigidity to the tank, which is particularly useful for improving the gauge accuracy and for determining the gas-tightness according to on-board tests ("On Board Diagnostics" or "OBD").

A particularly advantageous case is one in which the tank rests freely on the tops of the baffles or is attached to them by any attachnment means.

It is also beneficial, in order to decrease the overall cost of the vehicle and to simplify the assembly thereof, to integrate into the shell other functions independent of those specific to the fuel system itself. For example, at least one of the following devices can also be integrated into the shell, in a non-limiting manner, namely a windscreen washer tank, a system for attaching the spare wheel, or a storage compartment.

All the fuel systems according to the invention nay advantageously comprise, as a variant, a thermal and/or acoustic insulator in at least part of the confined space.

The term "thermal and/or acoustic insulator" refers to a compound or to a device which strongly attenuates the transmission of heat or of noise from the inside of the tank outwards and vice versa.

Where a shell is used for at least part of the jacket, the shell already provides, just by its presence, a degree of thermal insulation with respect to the external atmosphere and to radiation arising from the exhaust device of the heat engine of the vehicle. In addition, the shell inherently provides a degree of acoustic insulation with respect to the external atmosphere.

A first embodiment of the fuel system according to the invention consists of a hollow tubular body acting as a fuel pipe.

The term "fuel pipe" denotes any pipe of tubular form in which fuel flows. As examples of such a pipe, mention may be made, in a non-limting manner, of the fuel lines connecting the tank to the fuel pump, this pump to the carburation or injection system, the filler nozzle of the tank and any line possibly returning fuel to the tank.

According to this first embodiment of the fuel system according to the invention, the jacket is a pipe concentric with the fuel pipe and emerges into a device where the physical or chemical treatment of the flushing gas is carried out.

The concentric pipe is a tube of greater diameter than tat of the fuel pipe and placed around the later, so as to share its longitudinal axis. The concentric pipe and the fuel pipe define an annular cylindrical confined space. The material of the concentric pipe may or may not be identical to that of the fuel pipe, According to a second embodiment of the fuel system according to the invention, the hollow body is a fuel tank;

Optionally, the confined space surrounding this fuel tank may also comprise an accessory of a fuel system. The term "accessory of a fuel system" denotes any member in general through which fuel passes or any technical device for sampling, measuring or adjustment needed for the proper operation of the system A particular fuel system of this second embodiment is one in which the confined space comprises at least one of the accessories belonging to the following types:

canister, canister purging valve, fuel filter, part of a filler nozzle part of a circuit for degassing on filling, part of a circuit for ventilating during operation,
part of a fuel pipe,
an electrical connector.

The confined space may possibly contain several accessories of the same type.

The canister is a container as defined above. The fuel filter is any static or dynamic filtration device whose function is to rid the fuel of impurities, generally solids that it could contain, and which would be detrimental to the proper operation of the heat engine.

The filler nozzle is a nozzle made of metal or of single- or multilayer plastic which opens out into the fuel tank and whose function is to allow the periodic filling of the tank with fuel.

The term fuel pipe has the same meaning as that already indicated above. In keeping with the fuel system according to the invention, this may be made of plastic or of metal. Pipes made of plastic are preferred They may be single- or multilayer.

In particular, part of the fuel pipe, which is itself a fuel system in keeping with the first embodiment of the system according to the invention, may also be found in the confined space.

A variant of the second embodiment comprises at least one functional line of the fuel system which ends in the confined space. The term "functional line of a fuel system" denotes any pipe connected to the tank and designed to transport a gas and/or liquid fuel. Advantageously, several functional lines end in the confined space, so as to produce a multi-line port.

As examples of functional lines, mention may be made, in a non-limiting manner, of:
Purging line of a canister,
Vent line of a canister;
Line tag out fuel from a tank,
Line returning fuel to a tank.

In the case of a functional line formed by a purging line of a canister, it is advantageously possible to flush The confined space with the gas used to purge the canister. This situation is particularly beneficial when the canister is integrated into the tank.

According to his variant, it is particularly beneficial for the rigid jacket to be dismantleable. This then makes it possible to access the components contained in the confined space, when there is a need to dismantle or maintain all or some of these components, without risk of the fuel pouring out. An example well suited to this configuration of the rigid jacket is that where the dismantleable rigid jacket comprises a confined space including a fuel outlet line and a fuel filter which is thus very easy to replace or dismantle for their cleaning.

Other examples of components which can be incorporated in a confined space comprising a multi-line port are as follows:
fuel pressure regulator,
electrical supply w for a fuel pump;
electrical wires leading to a tank gauge system;
electrical wires leading to an electrical control valve;
electrical wires leading to a solenoid valve of a purging or vent nozzle of a canister;
electrical wires leading to at least one sensor measuring the level of filling of a canister;
a canister, as already mentioned above for a confined space which was not necessarily a multi-line port;
a ventilation or vent valve of the tang, in particular, a valve passing through the wall of this tank;
a device for detecting a gas leak, especially one required by an On Board Diagnostic (OBD) device.

Several components may be combined in the same multi-line port, in particular, several components of the same type In a preferred manner, the dismantleable rigid jacket of a multi-line port is connected in a sealed manner to the wall of the tank. The connection is made via any known attachment means, such as, in an non-limiting manner, applying and holding it by means of at least one nut screwed on a seating secured to one wall of the tank possibly comprising a flexible seal, clipping it on one wall of the tank, introducing it between two grooves carried by the tank, or a metal insert system of the "cam-lock" type.

It is also preferred that the rigid jacket of a multi-line port be separated from the external environment by means of a barrier sealed against the fuel vapours. An ideal situation is one where the rigid jacket is both dismantleable and separated from the external environment by means of a sealed barrier. The best protection is then achieved if this dismantleable rigid jacket is attached to a tank, he wall of which is itself sealed against liquid and gaseous fuel, at least in a surface region including this jacket.

A multi-line port can be mounted in various locations of a wall of a tank. Among the positions preferred, mention is made, in a non-limiting maimer, of the upper part of a tank, the lower pan of a tank and one of the faces of a tank, in particular the front face with respect to the vehicle on which the tank is mounted, so as to reduce the distance separating the multi-line port from the engine.

FIGS. 1 to 4, which follow, are given in order to illustrate particular embodiments of the invention, without thereby limiting its range.

FIG. 1 shows a tank (1) made of high-density polyethylene, fitted with a filler nozzle (15) and a nozzle cap (16). A fuel feed pipe (19), connected to a fuel pump (not illustrated in the figure) located inside the tank (1), leaves the connector (20) attached to a seating communicating with the pump inside the tank (1) and arrives at the inlet of a fuel filter (2), attached to an outer wall of the tank (1). A pipe for returning the fuel (1S) connects the outlet of the filter (2) to a second connector (21) attached to the seating and in communication with the internal volume of the tank (1). A fuel pipe (7) also connects the outlet of the filter (2) to an injection ramp (8) of a heat engine (not shown in the figure).

A vent valve (24) is joined to a canister (3) via a connector (22). The canister (3) is attached to the outer wall of the tank (1) and contains granulated activated carbon A purging line (6) connects the canister (3) to an air inlet device of the heat engine (not illustrated in the figure), via another connector (23). A third connector (10) carried by the canister enables the atmosphere external to the canister (3) to be connected with its internal atmosphere, a non-return valve placed in the connector (10) preventing any passage from the inside of the canister (3) towards the outside. An end piece (5) carried by the canister (3) a one end opposite that of the connectors (10), (22) and (23) connects the canister (3) to the open air, outside the tank. A non-return valve placed in the end piece (5) prevents any passage from the outside of the canister (3) towards the inside thereof.

A double jacket (14), (4) surrounds the tank (1), the pipes (18) and (19), the filter (2) and the canister (3) and is made in two pans, firstly by means of a substructure (14) of a vehicle (not shown in the figure) on which the tank (1) is mounted, and secondly by means of a lower shell (4) made of stiff high-density polyethylene, This shell (4) is attached to the vehicle by attachment points (17) integral with the substructure (14).

An orifice (9) puts a confined space (1), (4), (14) defined by the wall of the tank (1) and the double jacket (4), (14) in communication with the atmospheric air.

The lower shell (4) comprises profiles (11) acting as stiffeners and forming baffles in order to improve the flushing of the confined space. Profiles furnished with an acoustic insulator (13) are also used, at each end of the tank (1). In addition, a thermal shield (12) is attached to the lower shell (4), on the side close to an exhaust pipe (not shown in the figure) of the heat engine.

When the vehicle is stationary, with the heat engine switched off, a possible overpressure caused by an increase in the temperature of the fuel inside the tank (1) is released, as soon as a potentially dangerous threshold is reached, by opening the valve (24) and allowing gases loaded with fuel vapours into the canister (3), via the line and the connector (22). The vapours are then removed from the gases by means of the material lining the inside of the canister (3) and the purified gases escape to the open air via the end piece (5) which passes through the double jacket (4), (14). During his phase when the heat engine is switched off the possible evaporative losses from the wall of the tank (1), and those coming from a poor seal or from the permeability of the connections and of the lines leading to the connectors (22) and (23), remain contained within the confined space (1), (4), (14).

When the heat engine is operating, during some phases not requiring a fuel supply under optimum dosage conditions, an automatic control actuates a purge of the canister (3) and puts the line (6) in communication with the air inlet system of Me heat engine. The effect of this is to create a low pressure in the line (6), which, in the canister (3), causes gases in the confined space (1), (4), (14) thus to be sucked up via the connector (10). The pressure in the confined space (1), (4), (14) thus also quickly becomes low, which has the effect of causing the entry of fresh air via the orifice (9) and the flushing of this confined space.

The overall result of this is a considerable reduction in the evaporative losses of the tank (1) and of several of its accessories.

Figure 2:
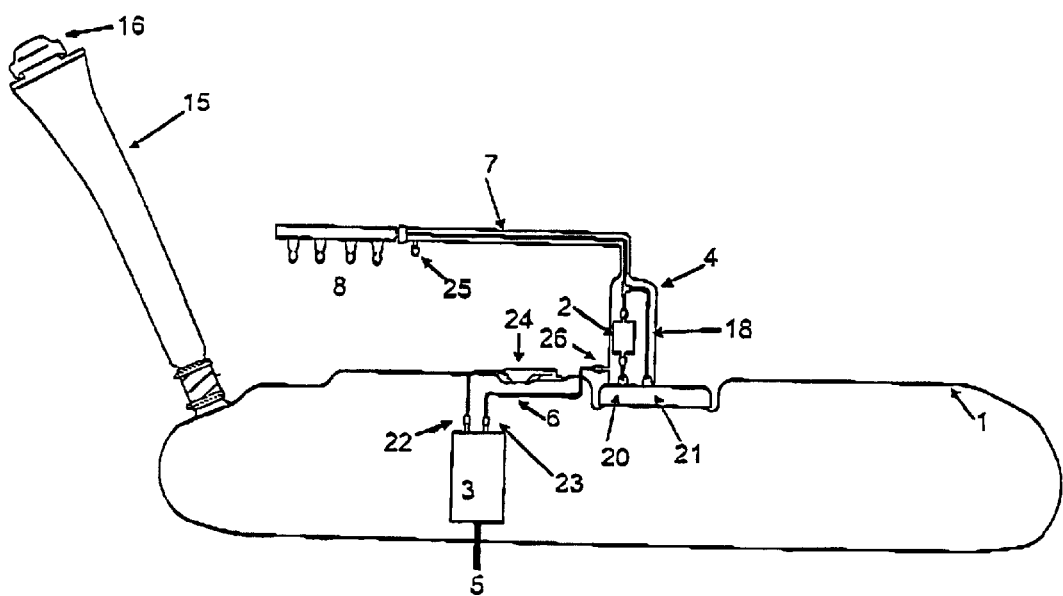

FIG. 2 shows a tank (1), fitted with a filler nozzle (15) and with a nozzle cap (16). A fuel filter (2) is connected to a connector (20) attached to a seating, in communication with a fuel pump located inside the tank (1) (not illustrated in the figure). A fuel return pipe (18) connects the output of the filter (2) to a second connector (21), attached to the seating and in communication with the internal volume of the tank (1). A fuel feed pipe (7) also connects the output of the filter (2) to an injection ramp (8) of a heat engine (not illustrated in the figure).

A vent valve (24) is connected to a canister (3) via a pipe and a connector (22). The canister (3) is attached to an outer wall of the tank (1).

A double jacket (4) covers the connectors (20) and (21) on the seating, the filter (2) and the feed pipe (7) and defines a confined space (4), (7), (18), (20), (21), (2) around these accessories (7), (18), (20), (21), (2). A purging line (6) of the canister (3) connects the connector (23) located on the canister (3) with the connector (26) located on the double jacket (4). A connection (25) is placed at the end of the double jacket (4), close to The injection ramp (8). A connection (25) (not illustrated in the figure) connects the confined space (4), (7), (18), (20), (21), (2) with an air inlet system of the heat engine. An end piece (5) carried by the canister (3) at an end opposite that of the connectors (22) and (23) connects the canister (3) To the open air, outside the tank (1). The canister (3) is filled with granulated activated carbon When the vehicle is stationary, with the heat engine switched off, a possible overpressure caused by an increase in the temperature of the fuel inside the tank is released, as soon as a potentially dangerous threshold is reached, via the opening of the valve (24) and by allowing gases loaded with fuel vapours into the canister (3), via the line (22). The vapours are then removed from the gases by the activated carbon lining the inside of the canister (3) and the purified gases are released into the open air via the end piece (5). During this shutdown phase of the heat engine, the evaporative losses due to poor sealing or to the permeability of the filter (2), of the lines (7) and (18) and of the connections with the various connectors (20), (21) and with the filter (2) remain contained within the confined space (4), (7), (18), (20), (21), (2).

When the heat engine is in operation, during certain phases not requiring a supply of fuel under optimum dosage conditions, an automatic control actuates a purge of the canister (3) and puts the connection (25) in communication with the air inlet system of the heat engine. The effect of this is to create a low pressure in the confined space (4), (7), (18), (20), (21), (2), which is communicated to the canister (3) via the line (22). Fresh air is then sucked into the canister (3) via the end piece (5) and the material retaining the fuel vapours is regenerated. The confined space (4), (7), (18), (20), (21), (2) is therefore purged at the same time as the canister (3).

The overall result is a significant reduction in evaporative losses from the accessories of the tank (1).

Figure 3:
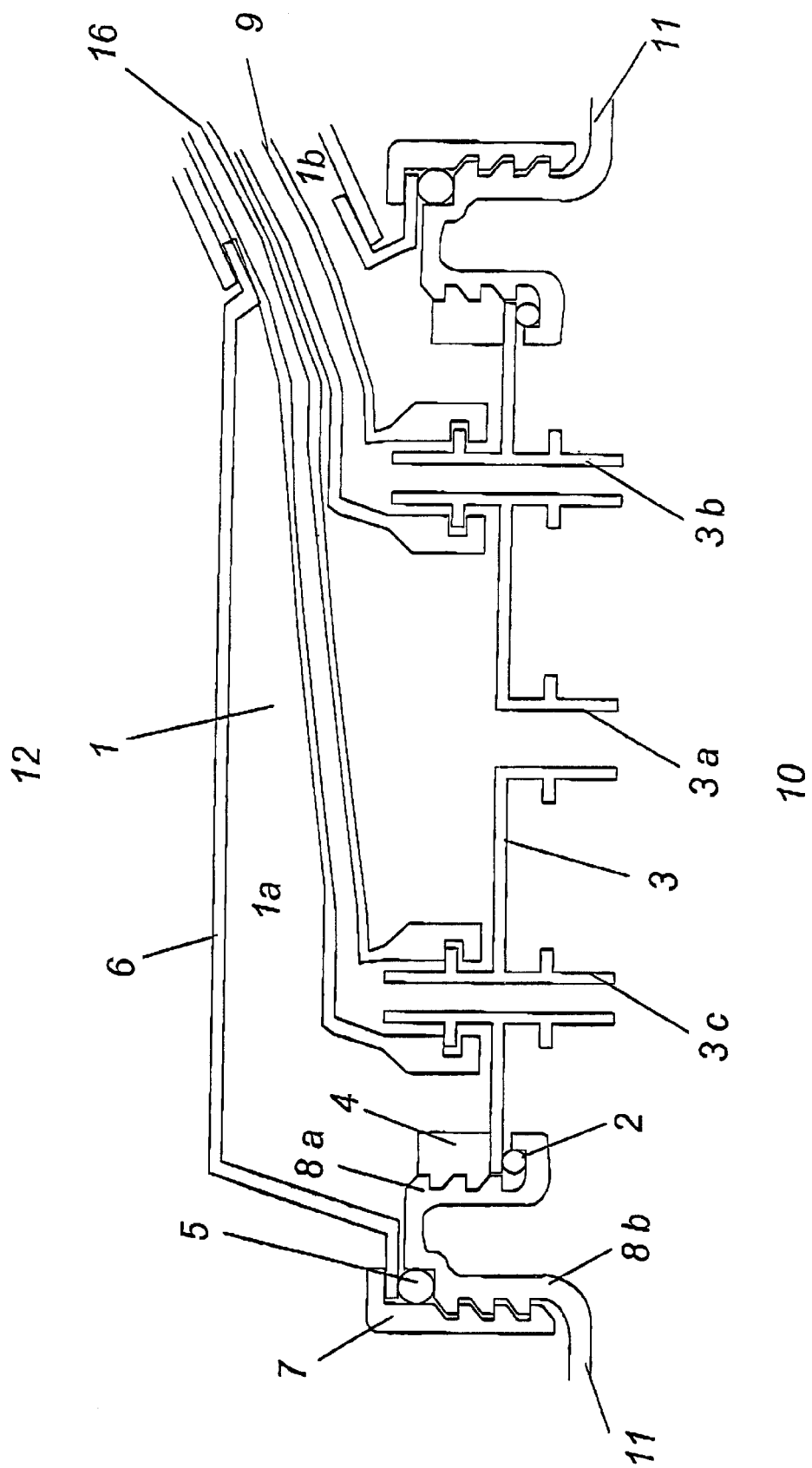

FIG. 3 illustrates a sectional view of part of a wall (11) of a tank (10), mounted on a vehicle with a heat engine (not shown in the figure), made of multilayer plastic obtained by extrusion-blow moulding and provided with a confined space (1a) producing a multi-line port (1, 3a, 3b, 3c). The wall (11) of the tank (10) is made from a six-layer structure comprising, starting from the outside of the tank and moving towards the inside thereof, a first layer made of high-density polyethylene ("HDPE"), a layer of manufacturing regrinds, a first adhesive layer comprising polyethylene grafted with maleic anhydride, a barrier layer against liquid and gaseous fuels made of an ethylcnie/vinyl alcohol copolymer ("EVOH"), a second adhesive layer and a second HDPE layer, both identical, respectively, to the first layers. The confined space (1a) is delimited towards the bottom by a plate made of polyacetal (3) which closes an orifice drilled in the wall (11) of the tack (10) and towards the top by a rigid shell (6), also made of polyacetal, which separates the confined space (1a) from the external environment (12).

The plate (3) is assembled on the tank (10) using a tightening nut (4) screwed onto a threaded part (8a) located on the border of the orifice and raised so as to form a seating. A flexible seal (2) provides the seal between the plate (3) and the inner volume of the tank (10). The rigid shell (6) is also assembled onto another thread (8b) of the seating by means of a tightening nut (7) and of a flexible seal (5). The nuts (4) and (7) are made of polypropylene filled with glass fibres and the flexible seals (2) and (5) have a toric shape and are made of fluoroelastomer.

A purging line (3a) connected to a canister (not shown) integral with the inside of the volume of the tank (10) ends in the confined space (1a) of the multi-line port (1). This purists line is extended, after the confined space (1a), by an outlet line (1b) of the multi-line port (1) connected to an air inlet device of the engine (not shown).

A second fuel outlet line (3b) connected inside the tank (10) to a fuel pump (not shown) is connected to a system for supplying fuel to the engine (not shown) via a fuel supply line (9) which crosses the multi-line port (1).

A third line (3c) for venting the canister integral with the tank (10) connects this canister to a second canister (not shown) located outside the tank (10) via a line (16) crossing the confined space (1a).

Figure 4:
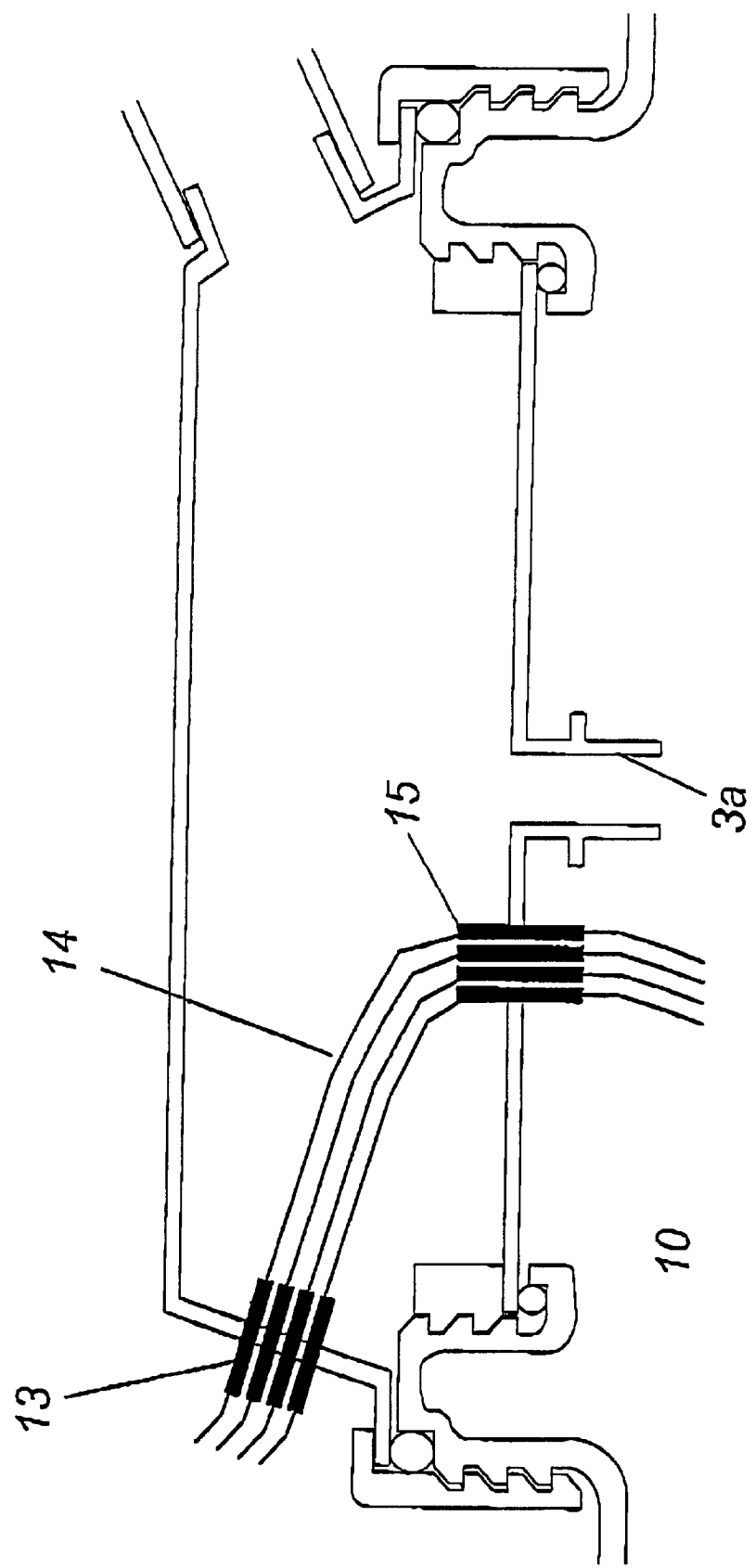

FIG. 4 illustrates another sectional view of the multi-line port described in FIG. 3, in which electrical connectors (13) and (15) have been shown, connected by wires (14) designed to supply an electric fuel pump, inside the tank (10), and a gauge device (not shown in the figure).

What is claimed is:

1. A Fuel system for a vehicle with a heat engine, comprising a hollow body made of metal or of plastic, designed to contain or to transport fuel, and means of covering this hollow body, in which at least part of the outer surface of the hollow body is surrounded by a rigid jacket, the hollow body and the rigid jacket defining, at least in part, at least one confined space around the hollow body, and according to which the confined space is fitted with a device for flushing by means of a gas intended to be subjected subsequently to a physical or chemical treatment, wherein the confined space is defined, at least in part, by the jacket and by a wall of the vehicle.

2. System according to claim 1 which comprises a pipe connected to a canister containing a material retaining the fuel vapours and an orifice drilled in the jacket by means of which air, used as a flushing gas, can be introduced and emerge into the pipe.

3. System according to claim 1 which comprises a pipe connected to an air inlet device connected to the engine of the vehicle and an orifice drilled in the jacket by means of which air, used as a flushing gas, can be introduced and emerge into the pipe.

4. A fuel system for a vehicle with a heat engine, comprising a hollow body made of metal or of plastic, designed to contain or to transport fuel, and means of covering this hollow body, in which at least part of the outer surface of the hollow body is surrounded by a rigid jacket, the hollow body and the rigid jacket defining, at least in part, at least one confined space around the hollow body, and according to which the confined space is fitted with a device for flushing by means of a gas intended to be subjected subsequently to a physical or chemical treatment, wherein at least part of the envelope is a shell made of plastic or of metal.

5. System according to claim 4, in which the shell acts as a support for the hollow body.

6. System according to claim 5 in which the shell has baffles which guide the flow of the flushing gas.

7. System according to claim 5 in which a thermal and/or acoustic insulator is incorporated into at least part of the confined space.

8. System according to claim 1, in which the hollow body is a fuel pipe.

9. System according to claim 8, in which the jacket is a pipe concentric with the fuel pipe and emerges into a physical or chemical treatment device.

10. System according to claim 1, in which the hollow body is a fuel tank.

11. System according to claim 10, in which the confined space furthermore comprises at least one of the accessories belonging to the following types:

canister, canister purging vale, fuel filter, part of a filler nozzle, part of a circuit for degassing on filling, part of a circuit for ventilating during operation, part of a fuel pipe, electrical connector.

12. System according to claim 10, in which at least one functional line of the fuel system ends in the confined space.

13. Fuel system according to claim 12, in which the confined space is flushed with a gas used to purge a canister.

14. System according to claim 12, in which the rigid jacket can be dismantled and is connected in a sealer manner, via an attachment means to a wall of the tank.

* * * * *